US012627525B2

(12) United States Patent
Neumann

(10) Patent No.: US 12,627,525 B2
(45) Date of Patent: May 12, 2026

(54) NETWORK SWITCH, COMMUNICATION SYSTEM AND METHOD FOR OPERATING A COMMUNICATION SYSTEM FOR TRANSMITTING TIME-CRITICAL DATA

(71) Applicant: Siemens Aktiengesellschaft, Munich (DE)

(72) Inventor: Markus Neumann, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 727 days.

(21) Appl. No.: 17/927,720

(22) PCT Filed: Apr. 28, 2021

(86) PCT No.: PCT/EP2021/061123
§ 371 (c)(1),
(2) Date: Nov. 24, 2022

(87) PCT Pub. No.: WO2021/239371
PCT Pub. Date: Dec. 2, 2021

(65) Prior Publication Data
US 2023/0353422 A1     Nov. 2, 2023

(30) Foreign Application Priority Data
May 28, 2020    (EP) ..................................... 20177065

(51) Int. Cl.
*H04L 12/46*          (2006.01)
(52) U.S. Cl.
CPC ...... *H04L 12/4633* (2013.01); *H04L 12/4641* (2013.01)
(58) Field of Classification Search
None
See application file for complete search history.

(56) References Cited

U.S. PATENT DOCUMENTS 9,043,792 B1 * 5/2015 Xu ...................... G06F 9/45558
                                                      718/1
2003/0206518 A1 * 11/2003 Yik ..................... H04L 12/4641
                                                       370/235
(Continued)

FOREIGN PATENT DOCUMENTS

CN          1917402        2/2007
CN          103139037      6/2013
(Continued)

OTHER PUBLICATIONS

PCT International Search Report dated Jul. 28, 2021 based on PCT/EP2021/061123 filed Apr. 28, 2021.
(Continued)

*Primary Examiner* — Otis L Thompson, Jr.
(74) *Attorney, Agent, or Firm* — Cozen O'Connor

(57)          ABSTRACT

Method for operating a communication system for transmitting time-critical data, wherein the datagrams are forwarded from a first communication device to a first network switch based on an identifier of a first virtual local network and a priority specification, where the first network switch encapsulates the datagrams sent by the first communication device in respective data frames, which are assigned to a data stream through a third sub-network, and inserts an identifier of a second virtual local network into the data frames, resources along a selected path are reserved in the third sub-network based on the identifier of the second virtual local network and a second network switch removes the datagrams encapsulated in the data frames assigned to the data stream from the received data frames and forwards the removed datagrams to a second communication device based on the identifier of the first virtual local network and the priority specification.

14 Claims, 3 Drawing Sheets

(56) References Cited

U.S. PATENT DOCUMENTS

| | | | |
|---|---|---|---|
| 2011/0080915 A1* | 4/2011 | Baykal | H04L 47/125 |
| | | | 370/395.53 |
| 2012/0026877 A1* | 2/2012 | Rajappan | H04L 65/752 |
| | | | 370/235 |
| 2013/0003601 A1* | 1/2013 | Gupta | H04L 45/18 |
| | | | 370/254 |
| 2013/0091349 A1* | 4/2013 | Chopra | H04L 45/50 |
| | | | 713/150 |
| 2013/0136123 A1 | 5/2013 | Ge et al. | |
| 2013/0322453 A1 | 12/2013 | Allan | |
| 2015/0103831 A1* | 4/2015 | Chandhoke | H04L 49/351 |
| | | | 370/392 |
| 2015/0326493 A1 | 11/2015 | Mace et al. | |
| 2015/0350156 A1 | 12/2015 | Ma et al. | |
| 2016/0182394 A1 | 6/2016 | Kiessling et al. | |
| 2017/0195213 A1 | 7/2017 | Evans et al. | |
| 2017/0250920 A1* | 8/2017 | Park | H04L 47/781 |
| 2017/0346765 A1* | 11/2017 | Immidi | H04L 45/302 |
| 2019/0068407 A1 | 2/2019 | Haga et al. | |
| 2019/0082016 A1 | 3/2019 | Sasaki et al. | |
| 2020/0274737 A1 | 8/2020 | Sasaki et al. | |

FOREIGN PATENT DOCUMENTS

| | | |
|---|---|---|
| CN | 104660479 | 5/2015 |
| CN | 105207903 | 12/2015 |
| CN | 105721335 | 6/2016 |
| CN | 206422787 U | 8/2017 |
| CN | 108370342 | 8/2018 |
| CN | 110677345 | 1/2020 |
| EP | 2938023 | 10/2015 |
| EP | 2940970 | 11/2015 |
| EP | 3035606 | 6/2016 |
| EP | 3226484 | 10/2017 |
| EP | 3896918 | 10/2021 |
| JP | 2017212727 | 11/2017 |
| WO | 2019001718 | 1/2019 |

OTHER PUBLICATIONS

Leipei et al. "Research and Implementation of Conversion Mechanism between WIA-PA Network and Time-Sensitive Network", pp. 1-80, Feb. 15, 2020.

"IEEE Standard for Local and Metropolitan Area Network-Bridges and Bridged Networks", pp. Jan. 1993, Jul. 6, 2018.

Song et al. "Summary on time Sensitive Network Technology", Process Automation Instrumentation, vol. 41, No. 2, 9 pages, Feb. 18, 2020.

* cited by examiner

400

401   402   403   404

500

501   502   503   504

401   402   403   404

NETWORK SWITCH, COMMUNICATION SYSTEM AND METHOD FOR OPERATING A COMMUNICATION SYSTEM FOR TRANSMITTING TIME-CRITICAL DATA

CROSS-REFERENCE TO RELATED APPLICATIONS

This is a U.S. national stage of application No. PCT/EP2021/061123 filed 28 Apr. 2021. Priority is claimed on European Application No. 20177065.8 filed 28 May 2020, the content of which is incorporated herein by reference in its entirety.

BACKGROUND OF THE INVENTION

1. Field of the Invention

The invention relates to a network switch, a communication system and method for operating the communication system for transmitting time-critical data, in particular control data in an industrial automation system.

2. Description of the Related Art

An industrial automation system usually comprises a large number of automation devices networked together via an industrial communication network and is used as part of a production or process automation system for controlling or regulating plants, machines or devices. Due to time-critical constraints in industrial automation systems, real-time communication protocols, such as PROFINET, PROFIBUS, Real-Time Ethernet or Time-Sensitive Networking (TSN), are predominantly used for communication between automation devices.

For example, because of their use for often very different applications, problems can arise in Ethernet-based communication networks when network resources are allocated for the transmission of data streams or data frames with real-time requirements competing for the transmission of data frames with large useful data content without specific service-level requirements. This can result in data streams or data frames with real-time requirements not being delivered in accordance with the requested or required quality of service.

Prioritized transmission of data frames is possible, for example, on the basis of virtual local area networks or virtual local area networks (VLAN) in accordance with the Institute of Electrical and Electronics Engineers (IEEE) 802.1Q standard, via appropriate tags inserted in data frames. For the synchronized and prioritized transmission of audio and video data streams (audio/video bridging) over communication networks, bandwidth reservation is provided for individual communication connections that are assigned a highest priority. Resources required for the transmission of audio and video data streams are reserved in communication devices, such as network switches. However, the forwarding of high-priority data frames only occurs after a successful reservation. Bandwidth monitoring is used to ensure that sufficient bandwidth is reserved in relation to the actual bandwidth used. A communication link that uses more bandwidth than is reserved would otherwise cause a malfunction of an entire communication network, and in the worst case, disable it due to overloading.

Credit-based Shapers (CBS) have been defined as a measure of bandwidth monitoring for the secure transmission of audio and video data streams over Ethernet-based communication networks in accordance with the IEEE 802.1 Qav standard. A credit-based shaper defines a transmission pause after each transmitted data frame to ensure bandwidth limitation in relation to a reserved bandwidth. However, in industrial automation systems when many data frames with low user data content are transferred for control data, which can be better regarded as data bundles or bursts, such forced pauses are extremely problematic.

WO 2019/001718 A1 describes a method for data transmission that allows a combination of protected communication and low network configuration overhead. When reserving resources for transferring data streams (streams) from a sender to a receiver, at least two paths are reserved, at least some sections of which are redundant. Extending a reservation protocol automatically configures duplicate filters on network nodes assigned to redundant path sections during a resource reservation.

European patent application 20170149.7 discloses a method for transmitting time-critical data, in which selected datagrams are assigned to data streams and transmitted between first communication devices and second communication devices via paths comprising at least the first and second communication devices. Reservation requests to provide resources for transferring the data streams are each transmitted to a domain controller. In the event of reservation requests, the domain controllers check whether the respective first and second communication device are contained in the same domain. Cross-domain reservation requests are each forwarded to a higher-level communication control device. The higher-level communication control device identifies domains affected by the reservation requests and transmits partial reservation requests restricted to respective sections of the paths to the domain controllers of the identified domains.

EP 3 035 606 A1 describes a method for data transmission in a communication network comprising at least 2 virtual local networks, in which data streams are each assigned a data stream-specific target device identifier. When a data stream is transmitted from a source communication device assigned to a first virtual local network to a destination communication device associated with a second local network, an identifier assigned to the data stream within the first virtual local network is converted into an identifier assigned to the data stream within the second virtual local network.

In the case of data transmission between two cells of an industrial automation system via a transit network that interconnects the two cells, when transmitted datagrams are transferred from a start cell into the transit network, essential prioritization information and information about logical network assignments can be lost. Transmitted datagrams can therefore no longer be forwarded to logical networks with correct prioritization information or appropriate assignments after a transition from the transit network to a target cell. Ultimately, this can result in data loss. In addition, transit between cells of an industrial automation system is usually time-critical. Therefore, the transit network should have deterministic properties, at least with regard to data traffic exchanged between two cells.

SUMMARY OF THE INVENTION

It is an object of the present invention is to provide a method for operating a communication system for transmitting time-critical data, which enables both an efficient exploitation of available system resources and a flexible and rapid adaptation to changing background conditions, and to provide a suitable implementation for implementing the method.

This and other objects and advantages are achieved in accordance with the present invention by a method for operating a communication system for transmitting time-critical data between two sub-networks that form a logical unit, via a third sub-network, which enables the data to be transmitted transparently through the third sub-network with low latencies and while maintaining original prioritizations, and by suitable means for implementing the method.

In accordance with the method for operating a communication system for transmitting time-critical data, datagrams are sent from a first communication device in a first sub-network and to a second communication device in a second sub-network via a third sub-network. The first and third sub-networks are connected via a first network switch, while the second and third sub-networks are connected via a second network switch. The first communication device inserts an identifier of a first virtual local network as well as a priority specification into the datagrams. The datagrams are forwarded from the first communication device to the first network switch based on the identifier of the first virtual local network and the priority specification. For example, the first and second sub-networks can be assigned to PROFI-NET cells, while the third sub-network is preferably a TSN-based transit network, where the datagrams are PROFINET frames.

In accordance with the invention, the first switch encapsulates the datagrams sent by the first communication device in respective data frames that are assigned to a data stream through the third sub-network, and inserts an identifier of a second virtual local network into the data frames. In order to transmit the data stream in the third sub-network, resources are reserved along a selected path between the first switch and the second switch using the identifier of the second virtual local network. The second network switch extracts the datagrams encapsulated in the data frames assigned to the data stream from received data frames and forwards the extracted datagrams to the second communication device using the identifier of the first virtual local network and the priority specification. In this way, a transparent transmission of prioritized data frames between the first and second sub-networks is achieved via the third sub-network. In particular, the reservation of resources for the data stream through the third sub-network can guarantee low latencies in the transmission.

The first and/or second network switch encapsulates or encapsulate the datagrams, for example, by inserting them into a user data region of the data frames. The user data region includes the identifier of the first virtual local network and the priority specification. In accordance with a particularly preferred embodiment of the present invention, the data frames into which the respective datagrams are encapsulated are VXLAN frames or frames for Layer 2 tunneling of the datagrams. This enables a particularly reliable and efficient implementation of the present invention. Advantageously, the first and/or second switch assigns/assign the identifier of the second virtual local network to data frames to be sent through the third sub-network that encapsulate datagrams, based on Ingress ports. This ensures a clearly defined handling of the datagrams as they pass through the third sub-network.

Preferably, the first or second switch specifies or specify quality of service parameters in a reservation request to reserve the resources for the data stream along the selected path. Here, each communication device or a communications control device forwarding data frames along the selected path uses the quality of service parameters to verify when a reservation request is made that sufficient resources are available in the communication device to transmit data in compliance with the specified quality of service parameters. If sufficient resources are available, then the communication devices along the selected path or the communication control device for the data stream will determine configuration information. Finally, the communication devices along the selected path are configured for resource provision for the data stream according to the determined configuration information.

The resources to be provided by the communication devices along the selected path include in particular usable transmission time windows, bandwidth, guaranteed maximum latency, queue count, queue cache and/or address cache in network switches or bridges. The third sub-network is preferably a time-sensitive network, in particular compliant with IEEE802.3-2018, IEEE 802.1Q-2018, IEEE 802.1AB-2016, IEEE 802.1AS-2011, IEEE 802.1BA-2011 and/or IEEE 802.1CB-2017. Here, forwarding of data frames within the third sub-network can be controlled by Frame Preemption, Time-Aware Shaper, Credit-based Shaper, Burst Limiting Shaper, Peristaltic Shaper and/or in a priority-based manner, in particular according to IEEE 802.1Q-2018. In accordance with a particularly preferred embodiment of the present invention, the data stream is configured bi-directionally in response to a reservation request.

In accordance with another particularly preferred embodiment of the present invention, the second communication device also inserts the identifier of the first virtual local network and the priority specification into datagrams to be sent to the first communication device. Here, the datagrams to be sent to the first communication device are forwarded from the second communication device to the second network switch based on the identifier of the first virtual local network and the priority specification. In addition, the second switch encapsulates the datagrams sent by the second communication device in respective data frames that are assigned to the data stream through the third sub-network, and inserts the identifier of the second virtual local network into the data frames. Furthermore, the first network switch extracts the datagrams encapsulated in the data frames assigned to the data stream from received data frames and forwards the extracted datagrams to the first communication device on the basis of the identifier of the first virtual local network and the priority specification.

The network switch in accordance with the invention is configured to implement the method in accordance with the disclosed embodiments and comprises a plurality of ports for connecting to communication devices or communication terminals forwarding datagrams. The network switch is configured to send datagrams from a first communication device in a first sub-network and to a second communication device in a second sub-network via a third sub-network. An identifier for the first virtual local network and a priority specification are inserted into datagrams sent by the first communication device.

Furthermore, the network switch is configured in accordance with the invention to encapsulate the datagrams sent by the first communication device in respective data frames that are assigned to a data stream through the third sub-network, and to insert an identifier of a second virtual local network into the data frames. In addition, the network switch is configured to extract from received data frames the datagrams encapsulated in the data frames assigned to the data stream and to forward the extracted datagrams to the second communication device on the basis of the identifier of the first virtual local network and the priority specification.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention will be described in more detail below by reference to an exemplary embodiment based on the drawings, in which.

DETAILED DESCRIPTION OF THE EXEMPLARY EMBODIMENTS

Figure 1:
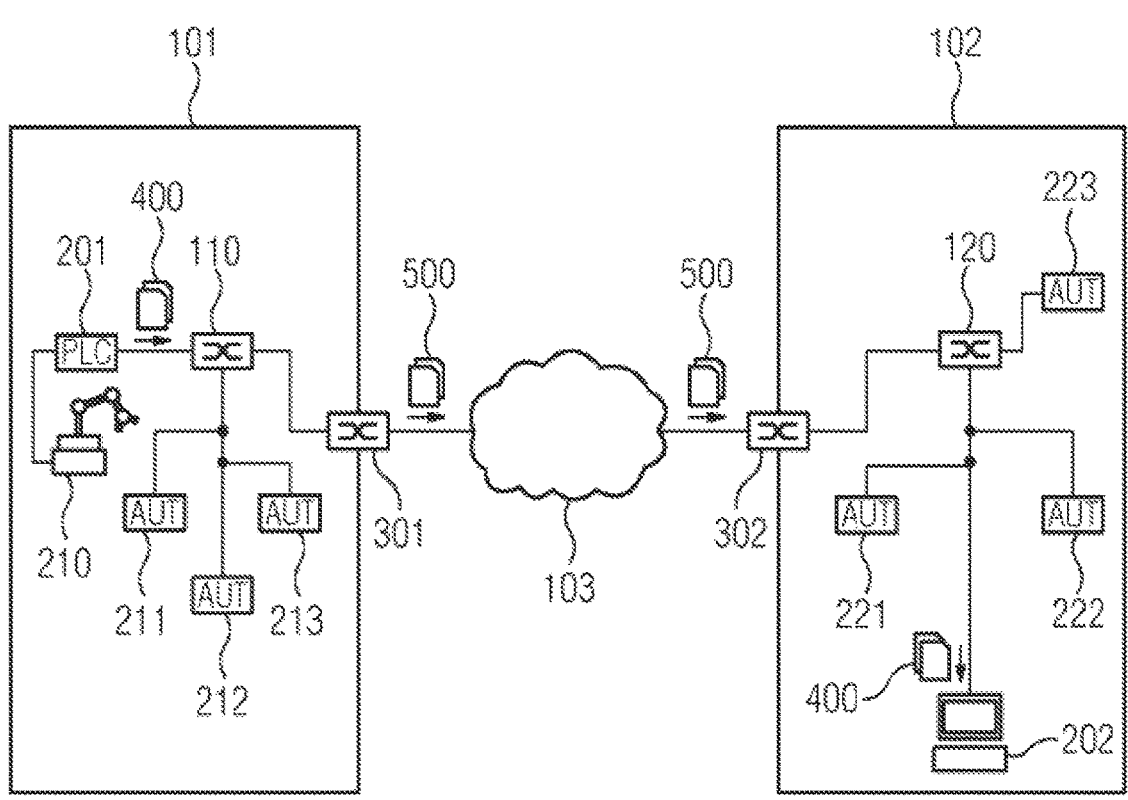
FIG. 1 shows a communication system comprising a plurality of communication devices for an industrial automation system in accordance with the invention.

The communication system for an industrial automation system shown in FIG. 1 is divided into three sub-networks 101, 102, 103, each comprising in turn a plurality of bridges or network switches 110, 120, 301, 302 as communication devices forwarding datagrams, and a plurality of communication devices or communication terminals 201-202, 211-213, 221-223 connected to the network switches 110, 120. In the communication system, in particular datagrams 400 are sent from a first communication device 201 in a first sub-network 101 and to a second communication device 202 in a second sub-network 102 via a third sub-network 103. The first 101 and third sub-network 103 are connected via a first network switch 301, while the second 102 and the third 103 sub-network are connected via a second network switch 302.

In this exemplary embodiment, the first communication device 201 is a programmable logic controller, while the second communication device 202 is a control and monitoring station. In addition, the datagrams 400 are PROFI-NET frames, with the first 101 and the second sub-network 102 each being assigned to a PROFINET cell. The third sub-network 103 represents a transit network for the PROFI-NET cells that is preferably formed or configured as a time-sensitive network, in particular in accordance with IEEE802.3-2018, IEEE 802.1Q-2018, IEEE 802.1AB-2016, IEEE 802.1AS-2011, IEEE 802.1BA-2011 and/or IEEE 802.1CB-2017. For example, forwarding of data frames (frames) within the third sub-network 103 can be controlled by frame preemption according to IEEE 802.1Q-2018, time-aware shaper according to IEEE 802.1Q-2018, credit-based shaper according to IEEE 802.1Q-2018, burst limiting shaper, peristaltic shaper, or priority-based shaper.

The bridges or network switches 110, 120, 301, 302 each comprise multiple ports as well as a backplane switch as a coupling element and are particularly used for connecting programmable logic controllers 201, control and monitoring stations 202, I/O controllers or I/O modules, which also constitute communication devices or communication terminals. Programmable logic controllers 201 each typically comprise a communication module, a central unit and at least one input/output unit. Input/output units can in principle also be formed as distributed peripheral modules, which are arranged remote from a programmable logic controller. Via the communication module, a programmable logic controller 201 can be connected to a network switch or router or additionally to a fieldbus. The purpose of the input/output unit is to exchange control and measurement variables between the programmable logic controller 201 and a machine or device 210 controlled by the programmable logic controller 201. The central unit is provided in particular for determining suitable control variables from recorded measurement variables. The above components of the programmable logic controller 201 are connected to each other via a backplane bus system, for example.

In principle, I/O modules can also be provided for the exchange of control and measurement variables with connected machines or devices. I/O modules can be controlled in particular via one I/O controller per automation cell. Alternatively, I/O modules can also be controlled by a remote programmable logic controller.

A control and monitoring station 202 is used to display process data or measurement and control variables that are processed or acquired by programmable logic controllers, input/output units or sensors. In particular, a control and monitoring station 202 is used to display values of a control loop and to change control system parameters. Control and monitoring stations 202 comprise at least one graphical user interface, an input device, a processor unit, and a communication module.

Figure 2:
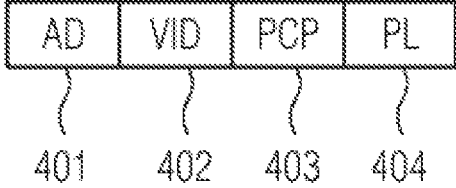
FIG. 2 shows a schematic representation of a datagram sent from a first communication device to a second communication device within the communication system of FIG. 1.

The programmable logic controller 201, as the first communication device, inserts an identifier 402 of a first VLAN, such as VID=0, and a priority specification 403, such as PCP=6, into the datagrams 400, which are shown schematically in FIG. 2. In this way, high-priority control data is identified in the PROFINET cells that comprise the first 101 and second sub-network 102. This data is transmitted cyclically in the PROFINET cells within specified or reserved time windows. For this purpose, in this exemplary embodiment all communication devices 110, 120, 201-202, 211-213, 221-223, 301-302 in the PROFINET cells are synchronously clocked. Using the identifier 402 of the first VLAN and the priority specification 403, the datagrams of the programmable logic controller 201 within the first sub-network 101 are forwarded to the first network switch 301. According to FIG. 2, the datagrams 400 comprise an address region 401 and a user data region 404 and in this exemplary embodiment essentially correspond to Ethernet frames in terms of their structure.

Both the first 301 and the second network switch 302 assign the identifier of a second VLAN to datagrams 400 received from the first 101 and second sub-network 102, which must be passed through the third sub-network 103, based on Ingress ports. To avoid loss or overwriting of the identifier 402 of the first VLAN and the priority specification 403 inserted into the datagrams 400 as they pass through the third sub-network 103, the first switch 301 encapsulates the datagrams 400 sent by the programmable logic controller

Figure 3:
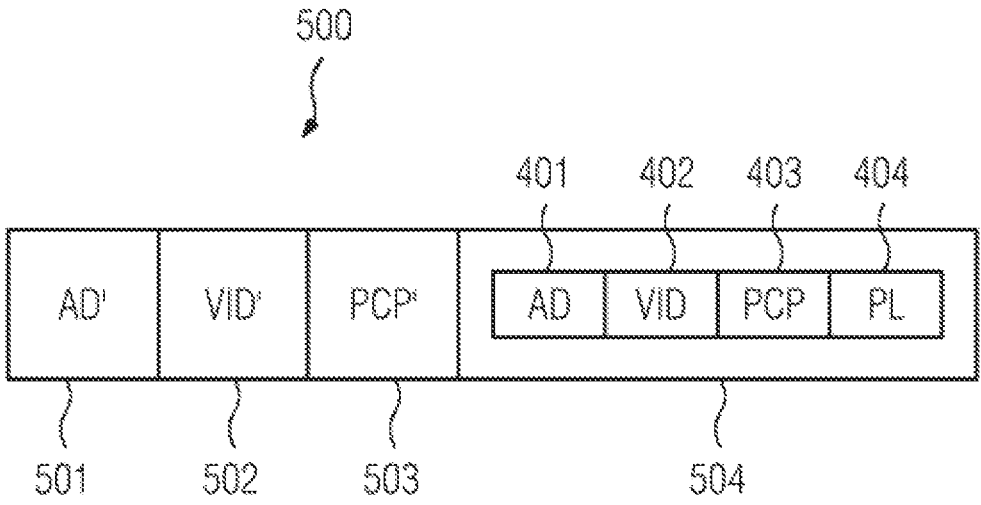
FIG. 3 shows a schematic representation of a data frame in which the datagram of FIG. 2 is encapsulated.

201 in respective data frames 500, which are assigned to a TSN data stream through the third sub-network 103 and shown schematically in FIG. 3, and inserts into the data frames 500 the identifier 502 of a second VLAN, such as VID'=1, as well as a priority specification 503, such as PCP'=6, for passage through the third sub-network 103.

Similarly, the control and monitoring station 202, as the second communication device, inserts the identifier 402 of the first VLAN and the priority specification 403 into datagrams 400 to be sent to the programmable logic controller 201. Accordingly, the datagrams 400 to be sent to the programmable logic controller 201 are forwarded from the control and monitoring station 202 to the second switch 302 based on the identifier 402 of the first VLAN and on the priority specification 403. In addition, the second switch 302 encapsulates the datagrams 400 sent by the control and monitoring station 202 in respective data frames 500, which are assigned to the TSN data stream through the third sub-network 103, and inserts the identifier 502 of the second VLAN into the data frames 500.

The first 301 and/or second network switch 302 encapsulates or encapsulate the datagrams 400 by inserting each of them into a user data region of the data frames 500. The user data region 504 of the data frames 500 includes in particular the identifier 402 of the first VLAN and the priority specification 403 for forwarding within the first or second sub-network. According to FIG. 3, the data frames 500 also contain an address region 501 and correspond to Ethernet frames in terms of their structure. Preferably, data frames 500 in which the respective datagrams 400 are encapsulated are VXLAN frames or frames for Layer 2 tunneling of the datagrams 400.

In order to transmit the TSN data stream, in the third sub-network 103 resources are reserved along a selected path between the first network switch 301 and the second network switch 302 on the basis of the identifier 502 of the second VLAN. The first 301 and second switch 302 specify quality of service parameters to reserve the resources for the TSN data stream along the selected path in a reservation request.

According to a decentralized stream reservation concept, each communication device forwarding data frames along the selected path uses the quality of service parameters to verify when a reservation request is made that sufficient resources are available in the respective communication device for data transmission in compliance with the specified quality of service parameters. In a centralized stream reservation concept, such a verification is performed by a central network controller or a network management engine as the higher-level communication control device. If sufficient resources are available, in the decentralized stream reservation concept the communication devices along the selected path each determine configuration information. In accordance with this determined configuration information, the communication devices along the selected path are configured for resource provision for the TSN data stream. According to the centralized stream reservation concept, the configuration information is determined by the central network controller or the network management engine.

The resources to be provided by the communication devices along the selected path in the third sub-network 103 include in particular usable transmission time windows, bandwidth, guaranteed maximum latency, queue count, queue cache and/or address cache in network switches or bridges. Preferably, the TSN data stream is configured bi-directionally by the third sub-network 103 in response to a reservation request.

The second switch 302 extracts the datagrams 400, which are encapsulated in the data frames 500 assigned to the TSN data stream, from data frames received via the third sub-network 103 and forwards the extracted data frames to the control and monitoring station 202 using the identifier 402 of the first VLAN and the priority specification 403. Similarly, the first switch 301 extracts the datagrams 400, which are encapsulated in the data frames 500 assigned to the TSN data stream, from data frames received via the third sub-network 103 and forwards the extracted data frames to the programmable logic controller 201 using the identifier 402 of the first VLAN and the priority specification 403.

With this present exemplary embodiment, it is possible to segment communication networks, in particular PROFINET or GOOSE networks, without loss of prioritization information, and to do so time-synchronously. A connection of PROFINET cells via a transit network is completely transparent for PROFINET data traffic. In particular, a mixed data transmission of PROFINET data traffic and non-PROFINET data traffic in the time-synchronous transit network is possible without the risk of overload in the transit network. Essentially, this concept allows Layer 2 communication over Layer 3 communication networks, which provides a basis for extending the possible flexibility of a network operation.

Figure 4:
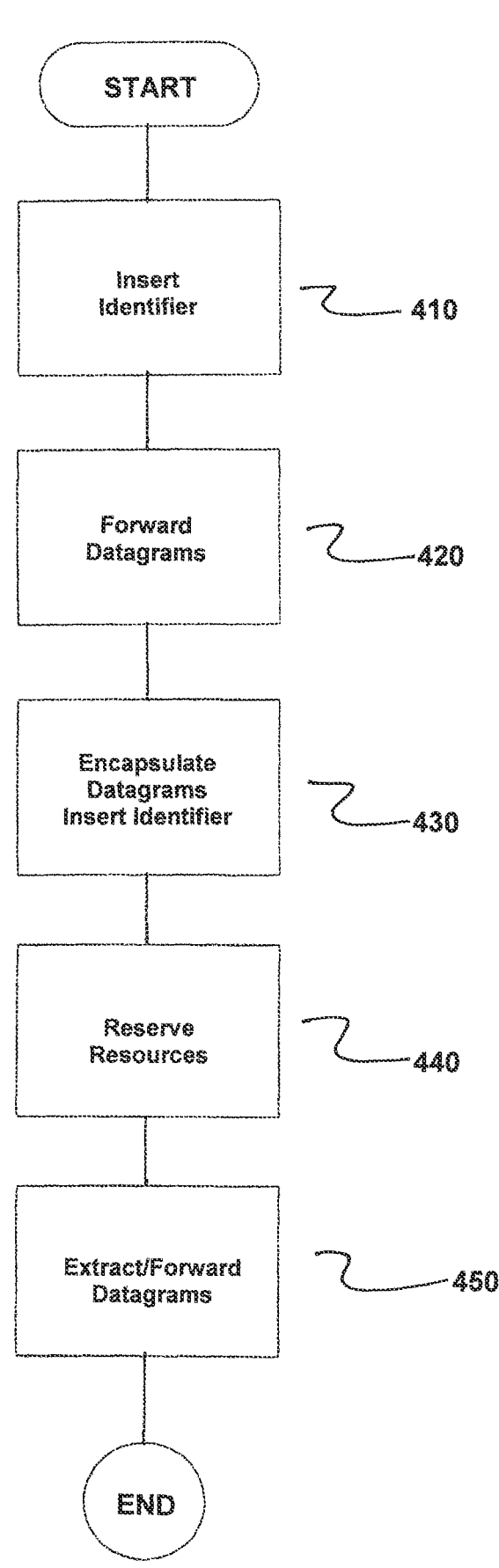
FIG. 4 is a flowchart of the method in accordance with the invention.

FIG. 4 is a flowchart of the method for operating a communication system for transmitting time-critical data, where datagrams 400 are sent from a first communication device 201 in a first sub-network 101 and are sent to a second communication device 202 in a second sub-network 102 via a third sub-network 103, where the first and third sub-networks being interconnected via a first network switch 301, and where the second and third sub-networks being interconnected via a second network switch 302.

The method comprises inserting, by the first communication device, an identifier 402 of a first virtual local network and a priority specification 403 into the datagrams 400, as indicated in step 410.

Next, the datagrams are forwarded from the first communication device to the first network switch utilizing the identifier of the first virtual local network and the priority specification 403, as indicated in step 420.

Next, the first switch encapsulates the datagrams sent by the first communication device in respective data frames 500 which are assigned to a data stream through the third sub-network, and inserts an identifier 502 of a second virtual local network into the data frames 500, as indicated in step 430.

Next, resources along a selected path between the first switch and the second switch utilizing the identifier of the second virtual local network are reserved to transmit the data stream in the third sub-network, as indicated in step 440.

Next, the second network switch extracts the datagrams encapsulated in the data frames assigned to the data stream from received data frames and forwards the extracted datagrams to the second communication device utilizing the identifier of the first virtual local network and the priority specification, as indicated in step 450.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for operating a communication system for transmitting time-critical data, datagrams being sent from a first communication device in a first sub-network and being sent to a second communication device in a second sub-network via a third sub-network, the first and third sub-networks being interconnected via a first network switch, and the second and third sub-networks being interconnected via a second network switch, the method comprising:

inserting, by the first communication device, an identifier of a first virtual local network and a priority specification into the datagrams;

forwarding the datagrams from the first communication device to the first network switch utilizing the identifier of the first virtual local network and the priority specification;

encapsulating, by the first switch, the datagrams sent by the first communication device in respective data frames which are assigned to a data stream through the third sub-network, and inserting an identifier of a second virtual local network into the data frames;

reserving resources along a selected path between the first switch and the second switch utilizing the identifier of the second virtual local network to transmit the data stream in the third sub-network;

extracting, by the second network switch, the datagrams encapsulated in the data frames assigned to the data stream from received data frames and forwarding the extracted datagrams to the second communication device utilizing the identifier of the first virtual local network and the priority specification;

wherein at least one of the first network switch and the second network switch encapsulates respective datagrams by inserting the respective datagrams into a user data region of the data frames;

wherein the user data region comprises the identifier of the first virtual local network and the priority specification; and wherein the data frames in which the respective datagrams are encapsulated are VXLAN frames or frames for Layer 2 tunneling of the datagrams.

2. The method as claimed in claim 1, wherein at least one of the first network switch and the second network switch specifies quality of service parameters in a reservation request to reserve the resources for the data stream along the selected path;

wherein each communication device forwarding data frames along the selected path or a communication control device uses the service quality parameters to verify when a reservation request is made whether sufficient resources are available in the respective communication device for data transmission in compliance with the specified quality of service parameters;

wherein the communication devices along the selected path or the communication control device for the data stream, in cases of sufficient resources existing, determine respective configuration information; and wherein the communication devices along the selected path are configured according to the determined configuration information for resource provision for the data stream.

3. The method as claimed in claim 2, wherein the resources to be provided by the communication devices along the selected path include at least one of (i) usable transmission time windows, (ii) bandwidth, (iii) guaranteed maximum latency, (iv) queue count, (v) queue cache and (vi) address cache in network switches or bridges.

4. The method as claimed in claim 3, wherein the third sub-network is a time-sensitive network.

5. The method as claimed in claim 4, wherein the time-sensitive network is compliant with at least one of (i) Institute of Electrical and Electronics Engineers (IEEE) standard 802.3-2018, (ii) IEEE standard 802.1Q-2018, (iii) IEEE standard 802.1AB-2016, (iv) IEEE standard 802.1AS-2011, (v) IEEE standard 802.1BA-2011 and (vi) IEEE standard 802.1CB-2017.

6. The method as claimed in claim 2, wherein the third sub-network is a time-sensitive network.

7. The method as claimed in claim 6, wherein the time-sensitive network is compliant with at least one of (i) Institute of Electrical and Electronics Engineers (IEEE) standard 802.3-2018, (ii) IEEE standard 802.1Q-2018, (iii) IEEE standard 802.1AB-2016, (iv) IEEE standard 802.1AS-2011, (v) IEEE standard 802.1BA-2011 and (vi) IEEE standard 802.1CB-2017.

8. The method as claimed in claim 6, wherein forwarding of data frames within the third sub-network is controlled by at least one of (i) Frame Preemption, (ii) Time-Aware Shaper, (iii) Credit-based Shaper, (iv) Burst Limiting Shaper, (v) Peristaltic Shaper and (vi) priority-based in accordance with Institute of Electrical and Electronics Engineers (IEEE) standard 802.1Q-2018.

9. The method as claimed in claim 2, wherein the data stream is configured bi-directionally in response to a reservation request.

10. The method as claimed in claim 1, wherein the second communication device inserts the identifier of the first virtual local network and the priority specification into datagrams to be sent to the first communication device;

wherein the datagrams to be sent to the first communication device are forwarded from the second communication device to the second network switch utilizing the identifier of the first virtual local network and the priority specification;

wherein the second switch encapsulates the datagrams sent by the second communication device in respective data frames which are assigned to the data stream through the third sub-network, and inserts the identifier of the second virtual local network into the data frames; and wherein the first network switch extracts the datagrams encapsulated in the data frames assigned to the data stream from received data frames and forwards the extracted datagrams to the first communication device using the identifier of the first virtual local network and the priority specification.

11. The method as claimed in claim 1, wherein the first and second sub-networks are assigned to PROFINET cells, wherein the third sub-network is a TSN-based transit network; and wherein the datagrams are PROFINET frames.

12. The method as claimed in claim 1, wherein at least one of the first switch and second switch assigns the identifier of the second virtual local network to data frames to be sent through the third sub-network which encapsulates datagrams, based on Ingress ports.

13. A network switch, comprising:

a plurality of ports for connecting to at least one of communication devices and communication terminals forwarding datagrams;

wherein the network switch is configured to:

send datagrams from a first communication device in a first sub-network and to a second communication device in a second sub-network via a third sub-network, an identifier of a first virtual local network and a priority specification being inserted into datagrams sent by the first communication device;

encapsulate the datagrams sent by the first communication device in respective data frames which are assigned to a data stream through the third sub-network, and to insert an identifier of a second virtual local network into the data frames;

extract the datagrams encapsulated in the data frames assigned to the data stream from received data frames; and forward the extracted datagrams to the second communication device using the identifier of the first virtual local network and the priority specification, wherein the network switch encapsulates respective datagrams by inserting the respective datagrams into a user data region of the data frames;

wherein the user data region comprises the identifier of the first virtual local network and the priority specification; and wherein the data frames in which the respective datagrams are encapsulated are VXLAN frames or frames for Layer 2 tunneling of the datagrams.

14. A communication system for transmitting time-critical data, comprising:

a first sub-network;

a second sub-network;

a third sub-network;

a first network switch which interconnects the first and third sub-networks;

a second network switch which interconnects the second and third sub-networks; and a first communication device in the first sub-network and a second communication device in the second sub-network, the first communication device being configured to send datagrams to the second communication device via the third sub-network and to insert into the datagrams an identifier of a first virtual local network and a priority specification, on the basis of which the datagrams are forwarded from the first communication device to the first network switch;

wherein the first switch is configured to encapsulate the datagrams sent by the first communication device in data frames assigned to a data stream through the third sub-network, and to insert in the data frames of a second virtual local network an identifier, on the basis of which resources along a selected path between the first switch and the second switch are reserved to transmit the data stream in the third sub-network, wherein the second network switch is configured to extract the datagrams encapsulated in the data frames assigned to the data stream from received data frames and to forward the extracted datagrams to the second communication device utilizing the identifier of the first virtual local network and the priority specification;

wherein at least one of the first network switch and the second network switch encapsulates respective datagrams by inserting the respective datagrams into a user data region of the data frames;

wherein the user data region comprises the identifier of the first virtual local network and the priority specification; and wherein the data frames in which the respective datagrams are encapsulated are VXLAN frames or frames for Layer 2 tunneling of the datagrams.

* * * * *